ically adjusted after a predetermined
United States Patent Office 3,445,846
Patented May 20, 1969

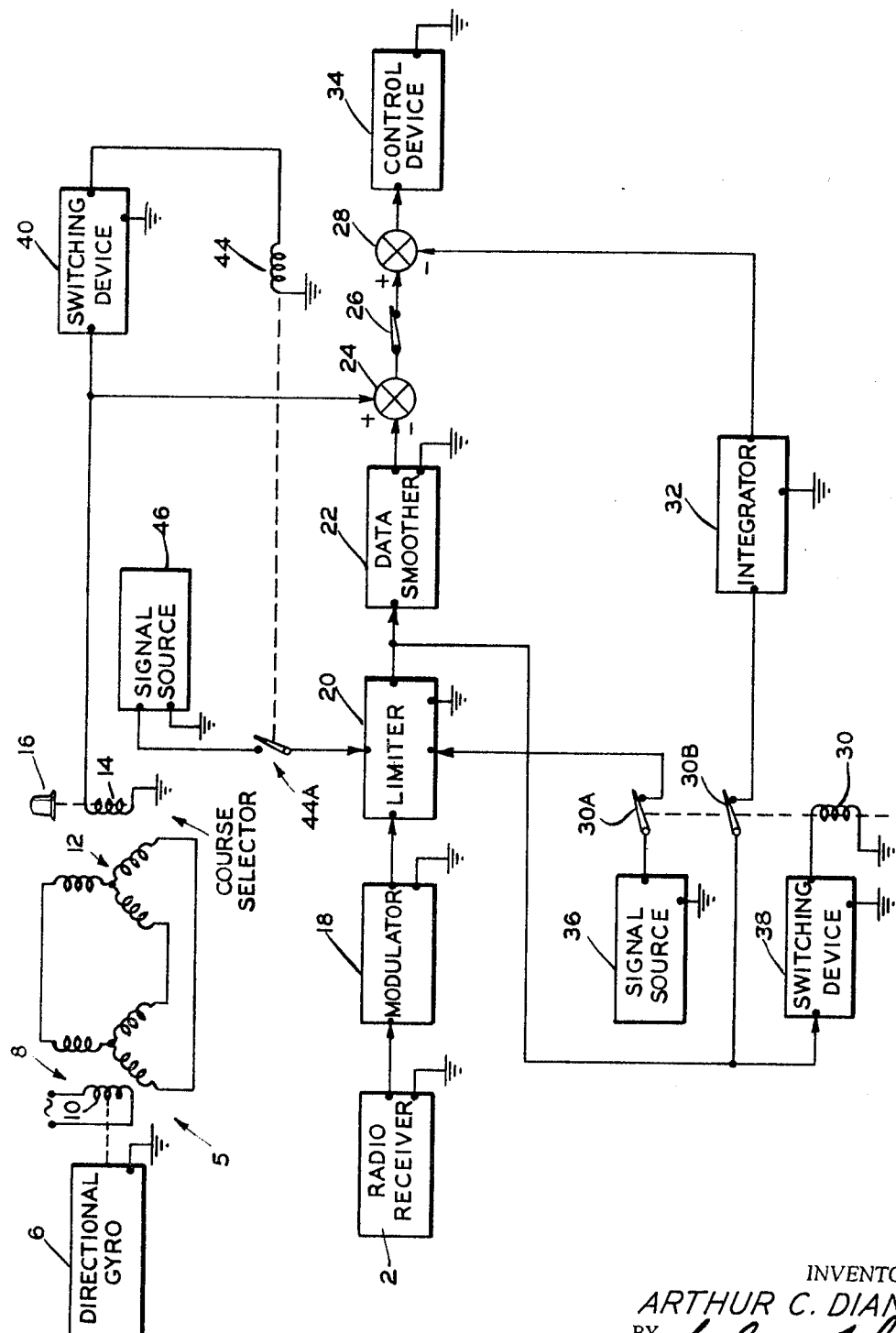

3,445,846
AIRCRAFT CONTROL SYSTEM INCLUDING AUTOMATIC COURSE CHANGING MEANS
Arthur Charles Diani, Clifton, N.J., assignor to The Bendix Corporation, a corporation of Delaware
Filed Aug. 10, 1967, Ser. No. 659,704
Int. Cl. G01s *1/08;* B64c *13/50, 15/00*
U.S. Cl. 343—107
8 Claims

ABSTRACT OF THE DISCLOSURE

Apparatus for guiding an aircraft to follow radio beams. The craft is controlled in response to heading error signals and in response to beam error signals initially at a lower limit for tracking a preselected beam. When the pilot manually commands a course corresponding to the bearing of another beam so that the heading error signals change at a predetermined rate, the limit is automatically adjusted for first capturing the other beam at a higher limit and then tracking said other beam at the lower limit.

BACKGROUND OF THE INVENTION

*Field of the invention*

This invention relates to navigation systems for guiding aircraft to follow radio beams. More particularly, this invention relates to means for limiting beam error signals at higher and lower limits for capturing and tracking radio beams, respectively.

*Description of the prior art*

An aircraft is controlled in response to radio signals from a ground based navigational station such as a visual omni range (VOR) station radiating an infinite number of radio beams in all directions. The pilot selects any one of these beams by manually selecting a given course and follows it toward the ground station. Prior to this invention, to insure satisfactory performance when changing course for following another beam, the pilot had to manually disengage the beam coupler, set the new course and then re-engage the beam coupler for first capturing and then tracking the other beam.

SUMMARY OF THE INVENTION

The invention includes means for providing heading error signals, means for providing beam error signals and a limiter for limiting the beam error signals. When the craft is tracking a preselected beam the heading error and beam error signals are substantially zero and the limiter is at a lower tracking limit. When the pilot manually commands a course corresponding to the bearing of another beam so that the beam error signal changes and the heading error signal changes at a predetermined rate, the limiter is automatinterval to a higher capture limit in response to the rate of change of the heading error signal. The limiter is maintained at the higher limit until the other beam is captured, and at which time the rate of change of the heading error signal decreases and the limiter is automatically adjusted to the lower limit.

One object of this invention is to provide a system for guiding an aircraft to follow radio beams and including means for automatically adjusting a beam error signal limiter for tracking a beam at a lower limit, and for capturing another beam at a higher limit and for tracking said other beam at the lower limit.

Another object of this invention is to adjust the beam error signal limiter to the higher capture limit in response to the rate of change of heading error signals.

Another object of this invention is to adjust the beam error signal limiter to the lower tracking limit in response to beam error signals below a predetermined level.

Another object of this invention is to adjust the beam error signal limiter to the higher capture limit in response to heading error signal rate after a predetermined interval during which the limiter is rendered unresponsive to the beam error signals.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE DRAWING

The single figure in the drawing is a block diagram of apparatus constructed according to the invention for guiding an aircraft to follow radio beams.

The pilot of an aircraft (not shown) selects an aircraft heading corresponding to the bearing of a preselected beam from a ground station and heading error apparatus 5 provides a signal corresponding to the position of the craft relative to said bearing. Heading error apparatus 5 includes a directional gyro 6, a synchro transmitter 8 having a rotor coil 10 positioned by the gyro 6 and a synchro receiver 12 having a rotor coil 14 positioned in accordance with the desired heading by a pilot operated heading selector knob 16. When the craft deviates from the desired heading a signal is provided across the synchro receiver rotor coil 14, and which signal has a magnitude proportional to the angular displacement of the craft from the desired heading and a phase dependent upon the direction of the displacement. This signal is hereinafter referred to as the heading error signal.

A ratio receiver 2 receives radio signals from the ground station and provides a direct current signal corresponding in polarity and amplitude to the direction and displacement of the craft from the radio beam. This signal is hereinafter referred to as the beam error signal. The beam error signal from radio receiver 2 is modulated by a modulator 18.

The modulated signal from modulator 18 is applied to a limiter 20 which is adjusted automatically for two operating limits by constant level signals from signal sources 46 and 36 connected to limiter 20 through a relay contact 44A and through a relay contact 30A, respectively, for first capturing the radio beam at a higher limit and then tracking the radio beam at a lower limit. The relay contact 44A is open and the relay contact 30A is closed when the craft is tracking the beam so that limiter 20 is set by the constant level signal from signal source 36, and the contact 44A is closed and the contact 30A is opened when the craft is capturing the beam so that limiter 20 is set by the constant level signal from signal source 46. The signal from limiter 20 is applied to a data smoother 22 which is essentially a low pass filter and removes high frequency components from the limited signal resulting from the motion of the aircraft through irregularities existing in the propagation pattern of the beams from the ground station.

The signal from data smoother 22 and the heading error signal provided across synchro receiver rotor coil 14 are applied to a summation means 24, and the signal from summation means 24 is applied through a manually operated beam coupler switch 26 to a summation means 28. The signal from limiter 20 is applied through a relay contact 30B to an integrator 32 to compensate for long term errors. Relay contact 30B is closed when the craft is tracking the beam and open when the craft is capturing the beam. The signal from integrator 32 is applied to summation means 28 which sums said signal with the signal from summation means 24. The signal from summation means 28 is applied to a control device 34 which operates the control surfaces of the aircraft.

When the craft is flying along the track defined by the preselected radio beam with a heading corresponding to the bearing of the radio beam, the heading error signal across synchro receiver rotor coil 14 and the limited beam error signal from limiter 20 are both zero. The limiter 20 is connected to a switching device 38 which responds to the zero signal therefrom for providing a logic output for deenergizing the relay 30, and which deenergized relay 30 maintains the contact 30B connecting limiter 20 to integrator 32 and the contact 30A connecting signal source 36 to limiter 20 closed. The synchro receiver rotor 14 is connected to a switching device 40 having time lag characteristics for purposes to be hereinafter explained, and which switching device 40 responds to the zero signal across rotor 14 for providing a logic output for deenergizing a relay 44 and which deenergized relay 44 maintains contact 44A connecting signal source 46 to limiter 20 open. Limiter 20 is thus adjusted by the output from signal source 36 to the lower limit which may, for example, provide a maximum course change capability of approximately eleven degrees, i.e., the signal provided by summation means 24 is limited to eleven degrees of aircraft course change.

When the pilot changes the course of the craft as may be necessary to follow another beam radiated from the ground station, he turns the selector knob 16 to the selected course and thus effects a change in the signal across rotor coil 14. When the rate of change of the signal across rotor coil 14 exceeds a predetermined limit, i.e., when the course change is significant so that the pilot turns knob 16 at a rate which exceeds a predetermined rate, switch 40 provides, after a predetermined interval in accordance with the aforementioned time lag characteristics, an output for energizing relay 44, and which energized relay 44 closes relay contact 44A. Since the craft is not tracking the radio beam, the signal from radio receiver 2, and hence the signal from limiter 20, is no longer zero. During the predetermined interval, switching device 38 responds to the changing signal from limiter 20, and when the signal reaches a predetermined amplitude, switch 38 provides an output for energizing relay 30, and which energized relay 30 opens contacts 30A and 30B. Integrator 32 is removed from the system and the constant level signal provided by signal source 36 is ineffective for adjusting the limiter 20. Limiter 20 is adjusted by the output from signal source 46 applied through contact 44A to the higher limit which provides, for example, a maximum course change capability of twenty-five to forty-five degrees.

The device constructed according to the invention for guiding an aircraft to follow radio beams provides means whereby the beam error signal limit is adjusted automatically for capturing and tracking the beams. Since the pilot may change the course of the craft without first disengaging the beam coupler and then re-engaging the beam coupler when the new course has been set, the course change is accomplished simply and more reliably.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:
1. An aircraft control system comprising:
 means for providing heading error signals;
 means for providing beam error signals;
 a limiter connected to the beam error signal means for limiting the beam error signals;
 means connected to the limiter and connected to the heading error signal means and responsive to the signals therefrom for controlling the aircraft;
 first means connected to the heading error signal means and connected to the limiter and responsive to the heading error signals for adjusting the limiter to a first limit; and
 second means connected to the beam error signal means and connected to the limiter and responsive to the beam error signals for adjusting the limiter to a second limit.

2. An aircraft control system as described by claim 1 wherein the first means connected to the heading error signal means and connected to the limiter and responsive to the heading error signals for adjusting the limiter to a first limit comprises:
 rate sensitive means connected to the heading error signal means for providing an output when the rate of change of the heading error signal exceeds a predetermined limit;
 means for providing a constant level signal; and
 switching means responsive to the output from the rate sensitive means for connecting the constant level signal means to the limiter so that the limiter is adjusted to the first limit in response to the constant level signal.

3. An aircraft control system as described by claim 1 wherein the second means connected to the beam error signal means and connected to the limiter and responsive to the beam error signals for adjusting the limiter to a second limit comprises:
 level sensitive means connected to the beam error signal means for providing an output when the beam error signals are below a predetermined level;
 means for providing a constant level signal; and
 switching means responsive to the output from the level sensitive means for connecting the constant level signal means to the limiter so that the limiter is adjusted to the second limit in response to the constant level signal.

4. An aircraft control system as described by claim 1 wherein:
 the first means connected to the heading error signal means and connected to the limiter and responsive to the heading error signals for adjusting the limiter to a first limit includes time lag characteristics for adjusting the limiter to the first limit after a predetermined interval.

5. An aircraft control system as described by claim 1 including:
 an integrator connected to the means for controlling the aircraft; and
 switching means for connecting the limiter to the integrator and operated by the second means so that the integrator integrates the limited beam error signals and the aircraft is controlled in response to the limited beam error signals, the integrator signals and the heading error signals when the limiter is adjusted to the second limit in response to the beam error signals.

6. An aircraft control system as described by claim 1 wherein the means for providing heading error signals comprises:
 a directional gyro;
 a synchro transmitter having a rotor coil positioned by the directional gyro;
 a synchro receiver connected to the synchro transmitter and having a rotor coil manually positioned in accordance with a predetermined heading; and
 the heading error signals being provided across the synchro receiver rotor coil when the craft deviates from the predetermined heading.

7. An aircraft control system as described by claim 1 including:
 a data smoother connected to the limiter for removing high frequency components from the limited beam error signals.

8. An aircraft control system comprising:

a directional gyro;

a synchro transmitter having a rotor coil positioned by the directional gyro;

a synchro receiver connected to the synchro transmitter and having a rotor coil manually positioned in accordance with a predetermined heading for providing heading error signals when the craft deviates from the predetermined heading;

means for receiving signals from a ground station radiating radio beams and for providing beam error signals when the craft deviates from a predetermined beam;

a modulator connected to the beam error signal means;

a limiter connected to the modulator;

means connected to the synchro receiver and connected to the limiter and responsive to the rate of change of the heading error signals for adjusting the limiter to a first limit when said rate of change exceeds a predetermined value;

means connected to the limiter and responsive to the limited beam error signals for adjusting the limiter to a second limit when the limited beam error signals are below a predetermined level;

a data smoother connected to the limiter for removing high frequency components from the limited beam error signals;

an integrator connected to the limiter and effective upon the limiter being adjusted to the second limit for integrating the limited signals; and means connected to the heading error signal means, connected to the data smoother and connected to the integrator for controlling the aircraft in response to the heading error signals and the signals from the data smoother when the limiter is adjusted to the first limit and for controlling the aircraft in response to the integrator signals, the heading error signals and the signals from the data smoother when the limiter is adjusted to the second limit.

References Cited

UNITED STATES PATENTS

| 2,860,335 | 11/1958 | Kellogg | 343—107 |
| 2,881,992 | 4/1959 | Hecht et al. | 340—107 X |
| 3,361,391 | 1/1968 | Medlinski | 343—107 X |

RODNEY D. BENNETT, Jr., *Primary Examiner.*

MALCOLM F. HUBLER, *Assistant Examiner.*

U.S. Cl. X.R.

244—77